A. E. SPINASSE.
APPARATUS FOR DRAWING GLASS CYLINDERS.
APPLICATION FILED MAR. 31, 1916.
1,386,441. Patented Aug. 2, 1921.
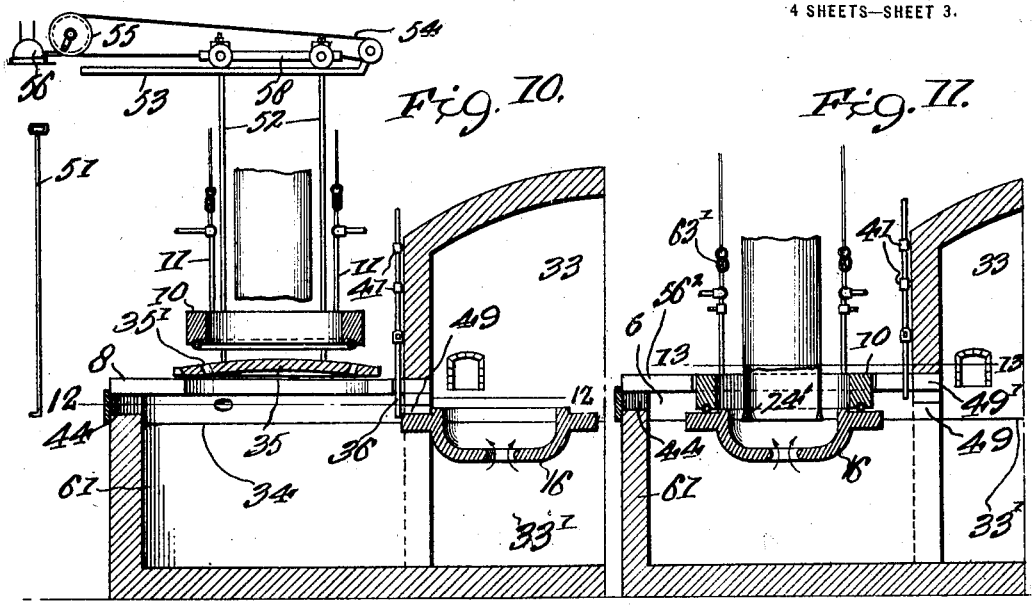
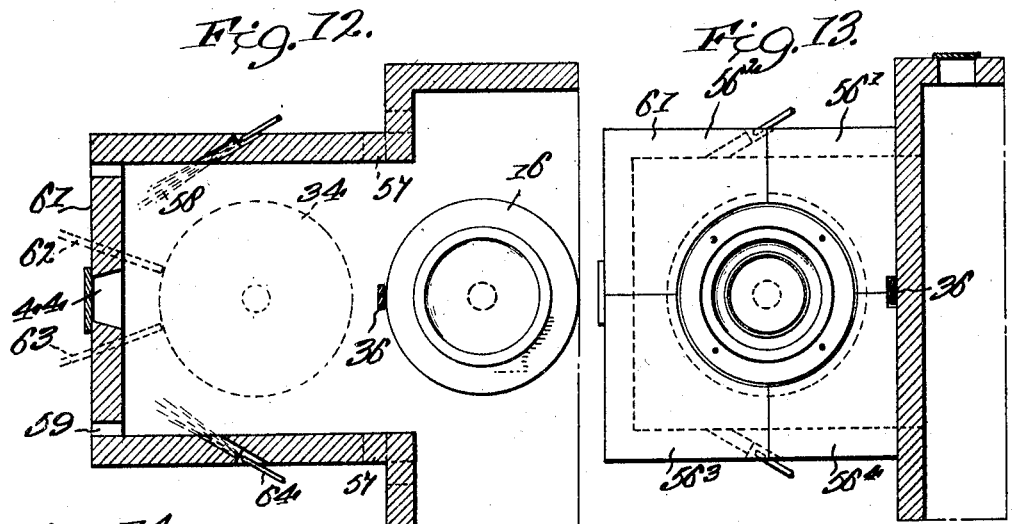
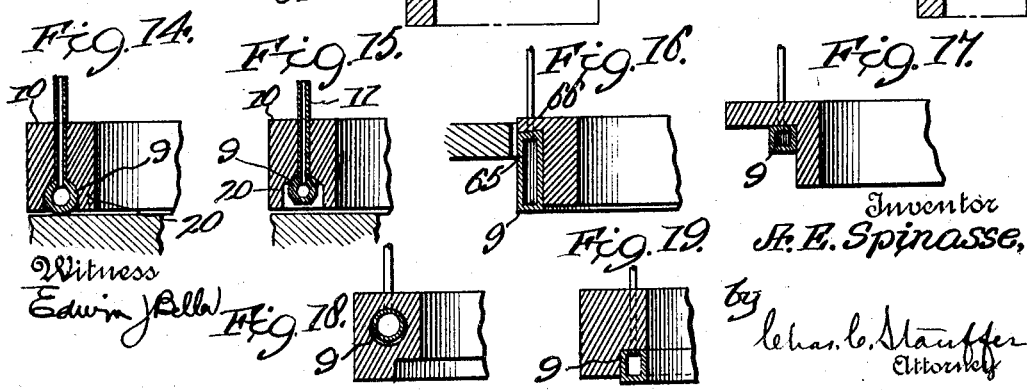

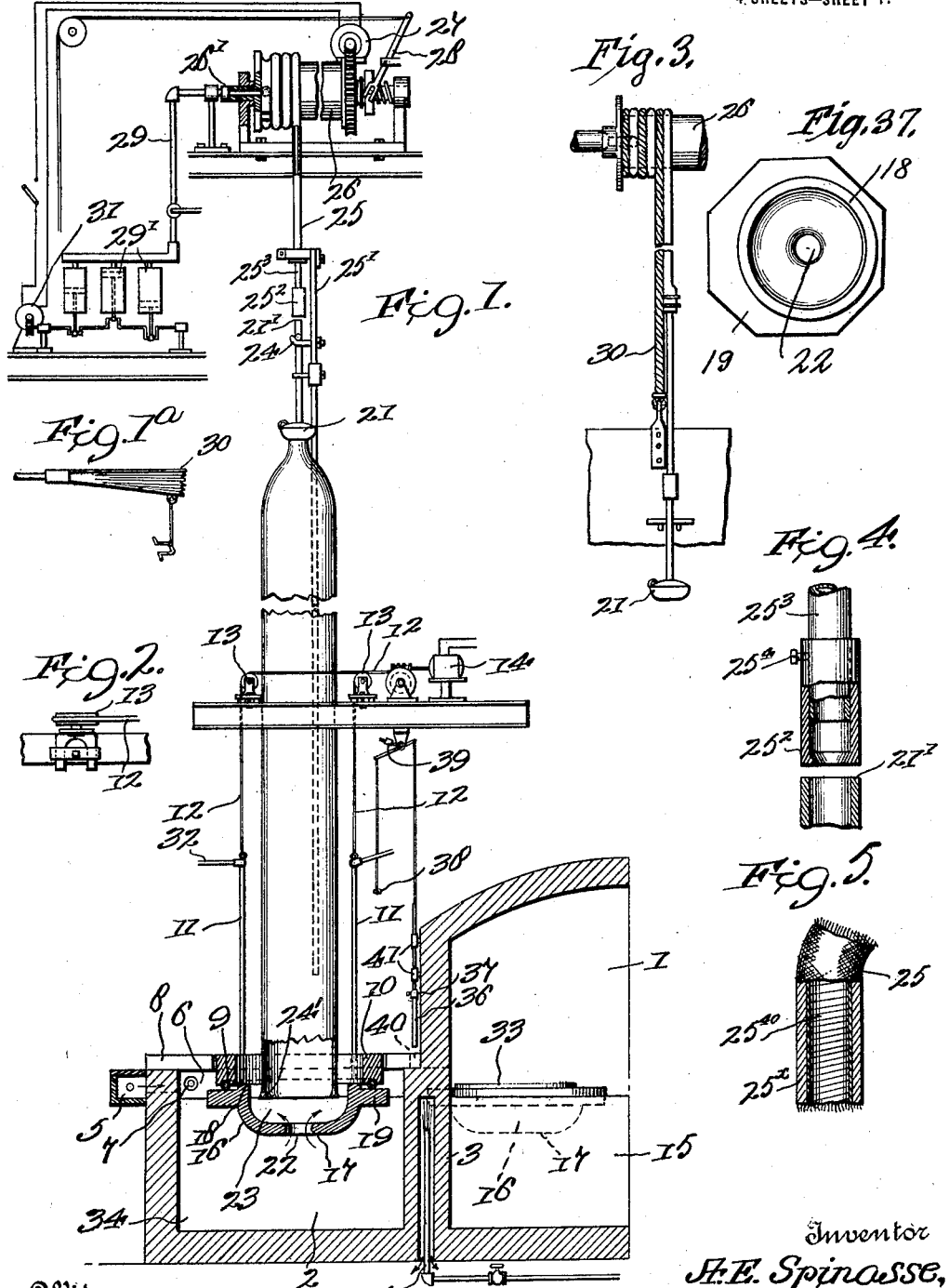

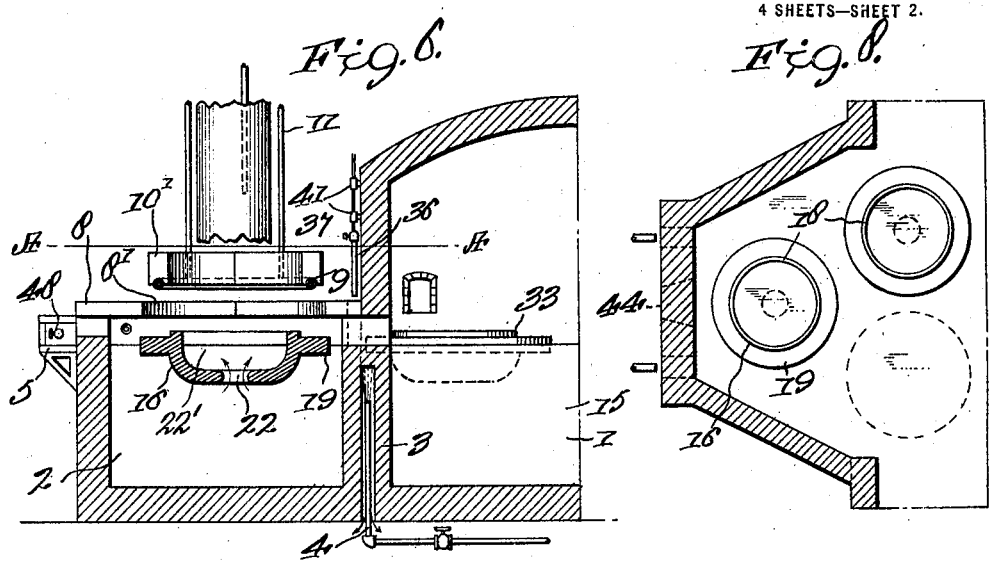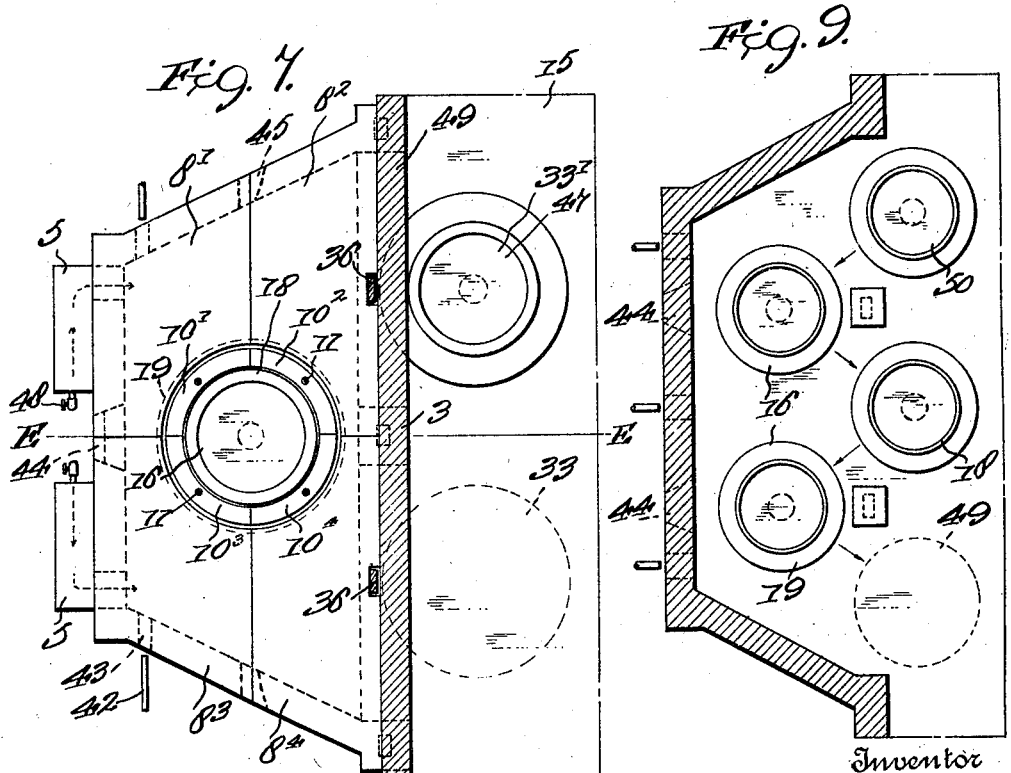

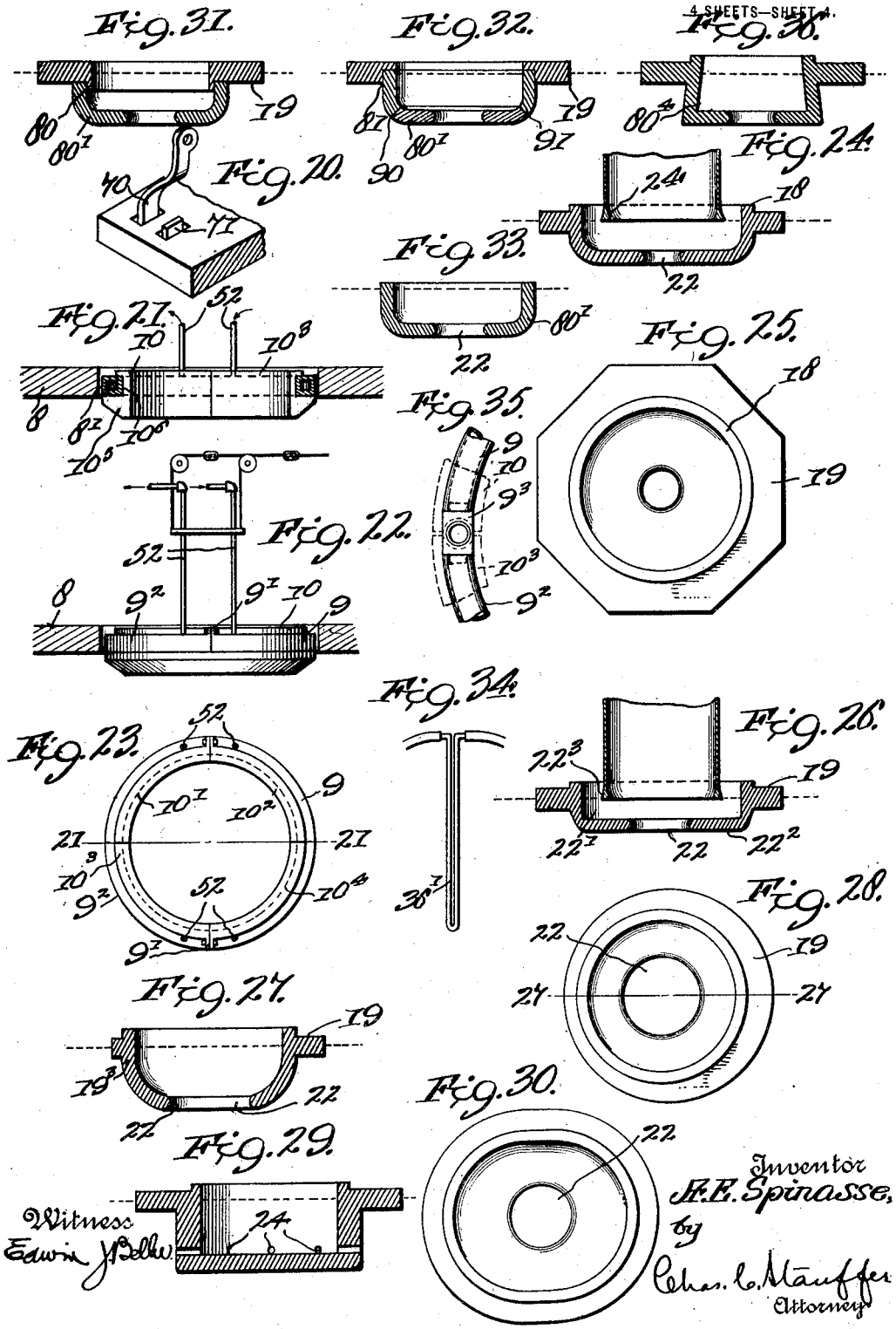

UNITED STATES PATENT OFFICE.

ARTHUR E. SPINASSE, OF MOUNT VERNON, OHIO.

APPARATUS FOR DRAWING GLASS CYLINDERS.

1,386,441.         Specification of Letters Patent.         Patented Aug. 2, 1921.

Application filed March 31, 1916. Serial No. 87,936.

*To all whom it may concern:*

Be it known that I, ARTHUR E. SPINASSE, a citizen of the United States, residing at Mount Vernon, in the county of Knox and State of Ohio, have invented certain new and useful Improvements in Apparatus for Drawing Glass Cylinders; and I do hereby declare the following to be a full, clear, and exact description of the invention, such as will enable others skilled in the art to which it appertains to make and use the same.

My invention relates to an apparatus for and process of drawing glass cylinders. My invention is particularly directed toward means and method for effecting the result under conditions which insure uniformity of the product.

My device contemplates a tank, a forehearth or drawing chamber, means for drawing the cylinders from the forehearth for keeping the temperature of the glass in the forehearth properly uniform, for a device adapted to segregate a portion of the glass so kept and to keep the quantity of such segregated mass constant during draw. It also contemplates the use of means for excluding air from the nascent cylinder and for proper and effective cooling of the glass thereof.

As intimated above, my invention also contemplates the process by which, in connection with the device aforesaid, the result desired is achieved.

In the drawings:

Figure 1 is a side view partly in section, showing my device in some detail.

Fig. 2 is a top view of the device for lateral adjustment of certain rollers.

Figs. 3, 4 and 5 are enlarged views of modifications.

Fig. 6 is a sectional view in part on line 6—6, Fig. 7 of one of my forehearths together with the drawing ring.

Fig. 7 is a plan view partly in section on line 7—7, Fig. 6 of one of such forehearths showing the recuperating position of the drawing ring.

Figs. 8 and 9 show modifications of such hearths.

Fig. 10 is a side sectional view corresponding somewhat to Fig. 6 of a modified hearth, showing means for covering the drawing opening and means to adjust the drawing member in its operative reducing position.

Fig. 11 is a view similar to Fig. 10, showing the drawing member in its operative drawing position.

Fig. 12 is a plan view on the line 12—12 of Fig. 10, showing certain additional features.

Fig. 13 is a top view of Fig. 12, showing the cover.

Figs. 14 to 19 show sections of modifications of my ring supporting device,

Fig. 20 shows the lifting or supporting means for the cover.

Fig. 21 is a sectional view on line 21—21, Fig. 23 showing one form of my support.

Fig. 22 is a side view of a modification of my support.

Fig. 23 is a top view of the same support.

Fig. 24 is a section of a deep dipping open-bottom pot.

Fig. 25 is a plan of such a pot having a polygonal flange.

Fig. 26 is a section of a pot having a sharp angle between the vertical walls and horizontal bottom.

Fig. 27 is a section on lines 27—27, Fig. 8, and Fig. 28 a plan of a pot having an eccentric flange.

Fig. 29 is a section of a pot having vertical walls, side openings and an elliptical flange. Fig. 30 is a top view of an oblong apertured pot.

Figs. 31 and 32 are sections of pots having detachable flanges.

Fig. 33 is a section of such a pot showing the flange removed.

Fig. 34 is a view of a modified holder member.

Fig. 35 is a top view of a part of a ring member, showing the point between the ring sections.

Fig. 36 is a sectional view of a modified pot, the walls being inclined inward from the bottom.

Fig. 37 is a detail showing a modification specific under the preferred form of float shown in Fig. 6.

In Fig. 1, 1 designates the melting tank, 2 the forehearth in communication therewith, 3 the front wall of the melting tank parted and hollowed, and thereinto is directed a blast of air for cooling the same. On the side of the front wall of the forehearth there may be a heating chamber 5 directing fire into drawing chamber 6; there may be provided also burners 7. I provide a cover or shelf 8 above the glass to cover the forehearth, resting upon the wall of the forehearth 2 and wall of the melting tank 3; and there is therein a drawing opening into which freely passes a vertically moving water cooled support 9 together with the supported refractory ring 10 preferably in sections, the whole capable of being raised above or lowered within or below the shelf by suitable means such as the support 11, cable 12, laterally adjustable wheel member 13, as shown in Fig. 2, and by means of suitably controlled motor on drum 14. This ring 10 serves to exclude drafts from the segregated glass and to aid in cooling the nascent cylinder 24'.

By recuperating my shield or holder under conditions in which it is preferably withdrawn from the drawing zone, I prolong its life and form, since I thus maintain it at a comparatively moderate and comparatively constant temperature. By doing this, i. e. by keeping my shield at a moderate and more or less constant temperature, I avoid many objections. The shield is preferably and usually of fire or other refractory clay. Clay expands and contracts considerably, particularly at extreme temperatures, and this leads to breakage and other losses, to which I shall refer below. By using a shield which is kept moderately heated, and which may be called cool in this relation, I obtain very useful and important advantages, that is I keep my glass in homogeneous and undisturbed condition. I draw the article with walls of comparatively even thickness, I avoid breakage, and I am enabled to draw more rapidly. I eliminate such defects as are traceable to great variation of temperature in a sometimes highly heated shield. Such a shield has a tendency to break down, crack, spall, or peel off, thereby permitting particles of clay to drop into the glass, making the glass strong and knotty, marring it, retarding the speed of draw, and tending to produce articles of uneven thickness of wall. I also do away with the drawbacks or objections attendant upon the use of a cold chilling shield or holder. Such a cold shield has a tendency to produce, by its too abrupt chilling effect, glass which is streaky and brittle, besides having other defects.

I provide a body of molten glass 15 in constant communication in the forehearth 2 and tank 1. In this glass floats a drawing member 16, which may be a ring but, in this case, is a self-feeding pot having a centrally apertured bottom 17, the aperture or opening being lettered 22, said opening 22 affording free communication with the mass of glass directly beneath, thus enabling pure hot glass to pass from below upward within said member 16. It is maintained below the surface of the glass at proper depth by means of vertical and horizontal gravity flanges 18 and 19, respectively. Flange 19 covers the surface of the glass and projects outwardly beneath the ring member 10 and preferably beneath and beyond the edge of inner opening of member 8, whereby dirt and particles of clay always present in the operation, are prevented from falling into the glass below and injuring its quality.

The composite ring member 10, as it will be seen in Fig. 14, has its water or fluid cooled support 9 in easy relation to the shouldered refractory part 10; the supporting cooling feeding pipes 11 are connected preferably integrally to support 9 and circulate cooling fluid such as water therein, the ring 10 resting supported in easy vertical position thereon. The support 9, therefore, is partially shielded by the overhung flange 20 of the member 10, which preferably is in section and, with support 9, may be of any suitable shape or form or with one opening of less diameter than the other, in fact shelf 8 could be omitted and the lid 35 made to cover the forehearth. The support 9 projects beneath member 10 when lowered in drawing position without adhesion contact with the upper surface of pot-flange 19; and with space outside the vertical pot rim 18 whereby the pot is set and maintained in suitable position relative to the surface or the glass and drawing tool 21. In Fig. 1, too, it will be noted that the water cooled support 9 is shielded by the rim 18 of the float member 16, said rim 18 may be made to any suitable height.

Heretofore great hindrance in the process of drawing has occurred because of the adherent condition existing between the shield or holder and the glass segregating member, the sticking action of the two when brought into contact, preventing easy adjusting or separation resulting in deterioration of both delay, lifting the segregating member out of level or position in the glass, or other undesirable movement impairing the quality of the glass.

By maintaining my shield or support under temperature conditions regulated so as to avoid adhesion with respect to the segregating member, the two contact and separate readily, thus enabling me to avoid the numerous drawbacks above enumerated; this is important. I maintain the quality of the glass, save time, prolong the life of the members, and enable them to be adjusted and maintain their proper assigned position. I also prefer to make and arrange the holding or depressing contacting points or surfaces between the members on a substantially horizontal plane, so that in connection with the non-adherent feature, horizontal or universal adjustment of one or both members may be made before or during drawing.

The opening 22 serves to replenish the shallow portion of commingled glass 23 within the receptacle or pot 16, the glass passing from center or outwardly to source of drawing, as indicated by the arrow in Fig. 1, and as the glass article 24′ is drawn or when the pot is depressed in the glass.

I preferably locate the feeding opening 22 beneath the glass so as to be within the space inclosed by the base of the cylinder drawn.

I thus provide a shallow portion of commingled glass segregated from the outside mass of glass and from the body beneath. From this a glass cylinder is drawn upwardly by means of bait 21, carriage 24, tubular cable or flexible pipe 25, which is lowered or raised by means of drum 26, motor 27 and clutch 28. Air pressure is generated by a set of pumps 29′ or by bellows 30, or other suitable means, operated by motor 31 in a suitable manner. Air is conducted within the cylinder, being drawn by means of fixed pipe 29 pivoted at 26′ to a hollow axle of the hollow winding drum 26, and by means of hollow winding cable 25 attached to said drum and drawing carriage 25′. Air is provided to the bait and cylinder drawn, as follows:—The bait 21 is supported upon the carriage at 24 and, as shown in Fig. 4, with its open top pipe handle 21′ directly beneath hollow stem 25$^a$ of pipe 25, provided with a sleeve collar 25$^2$ which may screw, but preferably freely slides on said stem as desired, with its opening below preferably smaller than the top opening 21′ of the bait handle. A screw 25$^4$ holds the sleeve in any desired position, or projects into a vertical slit, not shown but provided in said stem covered by the sleeve to retain a determined range of vertical loose motion to or from the bait. For operative drawing position the sleeve may be in loose contact with the top of the bait, but is preferably held in a suitable position spaced above the pipe to direct an open current of air within the bait and nascent cylinder.

In Fig. 3 I show a modification consisting in a blowing flexible tube and a cable 30 coupled and winding together on the drum.

In Fig. 5 I show a fragment, partly in section, of a hollow metal cable 25, showing a preferred form of construction in which 25$^{40}$ is an inner flexible metal tube or coil around which a cable 25 is applied or wound in a suitable manner; this provides a hollow cable which may be used for traction or to convey fluid, or both.

I preferably make the feeding opening 22 beneath the glass well within the inside diameter of the cylinder drawn.

The supports 11 have flexible fluid conveying connections 32 from a suitable source of cooling fluid, to permit free vertical movement of a composite ring 10. When the glass becomes too hard for proper drawing, this member may be used to lift the member 10, whereby the cylinder is severed at its base in the usual manner, and the float member 16 may be moved within the deep heated chamber, as indicated by numeral 33 in Fig. 1; and it is maintained in such position by rod members 36, which may be in any number and which are preferably made up of refractory material, held in sockets 37 and operated vertically in guides 41 by means of handle 38, through opening 40 in shelf 8 in the tank, and is held in low or high position by means of weight 39. In Fig. 10 I show the rod in pot holding position. Preferably rod 36 engages the top edge of the float member.

The body of glass 34 is now reheated and recuperated and may be freed from floating impurities, and accordingly the composite ring 10 is withdrawn from the furnace and the opening of the shelf 8 may be covered by lid 35, as shown in Fig. 10. I maintain purity of glass by freeing from the floats any mass of molten glass in which a glass segregating member has stood a length of time. Lid 35, as shown, moves horizontally slightly spaced above cover 8 and its opening therethrough, and when in position over the opening, shields ring 10 from the heat of the float, and of the molten glass within the furnace or forehearth, the ring 10 recuperating or cooling when elevated into the open air above the furnace during reheating of the glass within said furnace.

Thus without abrupt chilling, rapid drawing from the homogeneous segregated position of molten glass may be effected within said recuperated member 10 when it has been lowered into drawing position. Furthermore, said ring or member is thus made to last longer. The shallow portion of glass in pot at 33′ being exposed within the deep heated chamber 33, becomes purified and is reheated to a temperature preferably not above that required for drawing. By this time the body of glass 34 has recuperated, and, as shown in Fig. 11, the float pot member is again moved to drawing position in said glass zone 34, while the body of molten glass at 33′ is now freed and recuperates; the lid 35, when used, is now removed, exposing the glass in the forehearth for drawing, composite ring 10 is lowered to its operative position so as to hold the glass drawing member 16 in suitable position by the non-adherent water-cooled support 9 of said ring; the bait 21 is then lowered to the glass, and the article without further delay may be drawn from the segregated glass exposed to the chilling action of the recuperated refractory ring 10. The ring device may be lowered at will, and thereby may depress the member 16 into partially submerged position causing the glass to well up through opening 22; owing to this fact the level of the glass in the tank may vary without interfering with the drawing.

I have discovered that the float member when in position at 33', has a tendency to float toward the front of the furnace. For this reason I provide holder 36, which may be water-cooled as shown in Fig. 35 by pipe 36', to maintain said float member in reducing position. On removing the holding member, which is done shortly before the drawing, float member gently floats to drawing position.

I have, therefore, a method of alternate recuperation of drawing and reducing points or stations and regulated at will, thereby preserving the quality of the molten glass; and by heating the glass to a point of purity not above that required for drawing in the drawing member, the glass remains somewhat tempered and homogeneous, from which a better article may be drawn and with greater speed.

It will be observed that the glass segregated by the floating pot is replenished from below as a cylinder is drawn, so that the character of the glass in the forehearth directly determines, in a great measure, the character of the glass in the finished product. The character of the glass segregated is, however, dependent upon other things. It is obvious that after a draw the pot is filled with chilled and sluggish glass. As the pot is pushed aside, it carries this with it into the furnace. After subjection to the furnace heat for a sufficient time, this sluggish glass becomes very fluid. Owing to this fact and to the inertia of a mass of glass, when the segregating member is brought again into drawing position some of the segregated glass is replaced by glass from the furnace, the rate of replacement depending upon the viscosity of the glass, the depth at which the pot floats, the size of the opening, and the rate at which the pot is moved.

As the pot passes into the forehearth and takes position, the segregation has a tendency to become more complete. The segregated mass of glass comes, in a measure, from all the parts through which the pot moves in the furnace, and is supplied from the part just below the surface in the forehearth. This makes for homogeneity. The glass in the pot is in restricted but mixing communication with the glass of the tank.

Broadly, the body of glass 24 in which the pot floats at drawing zone need not recuperate every draw, for instance, as shown in Figs. 6 and 7, Fig. 6 being a modification or another vertical view of tank part shown in Fig. 7 on line E—E, showing the cylinder parted from the glass and the composite ring 10 well elevated. Opening 8' in cover 8 may now be covered as shown in Fig. 10, and the glass 22' in pot 16 reduced at drawing point, or, as shown in Fig. 7, a plan view of Fig. 6 on the line A—A, after drawing, the pot may at once be floated away from the drawing position, and a pot with recuperated glass be brought at once into said drawing position for drawing, Fig. 6, showing ring 10 withdrawn, elevated to suitable height above the drawing chamber for recuperation as well as to provide room for access to the glass, its grooved bottom resting upon circular hollow metal pipe support 9 which projects therebeneath supported by pipes 11 feeding thereinto, a current of cooling fluid.

In Fig. 7 I show the fixed shelves $8'$, $8^2$, $8^3$, $8^4$; the composite ring member is made up preferably of a number of parts or diaphragms $10'$, $10^2$, $10^3$, $10^4$. It will be seen that drawing member or pot 16, by means of hook member 42 inserted in any one of the openings 43, 44, 45, may be moved to reducing position 33, thereby freeing glass at drawing point for recuperation; however, drawing member 47 may now be floated to the drawing point, as the time limit of recuperation may be varied and need not correspond to the time of reducing the glass at 33 or 33'. Thus a saving of time may result. Recuperation, however, is not essential though preferably resorted to.

In Fig. 7 I give a good view of the heat generating chambers 5 with burners 48 located beside the forehearth away from the surface of the glass, thus avoiding the usual falling particles therein and marring of the glass mass; burners 48 are directing burning gases so as to generate intense heat into the horizontal chamber 5, which heat or combustion, as per dotted arrows, in large volume is evolved above the glass into the forehearth chamber 6, preferably discharging into the corners of the forehearth, and for general heating, since the chamber 6 is devoid of obstructing walls. This generated heat with that of the tank furnace affects the glass between draw. I show also the front wall of the main furnace open at 49 and wall 3 recessed for cooling by air pipe 4, as shown in Fig. 6. However, the wall 3 and chamber 5 may be omitted, as shown in Fig. 8. Compactness is thus obtained, each drawing member moving back and forth to the right and to the left from drawing point in the forehearth to reducing point in the tank through said opening 49, the reducing points and drawing point forming a triangle, the reducing points being idle for recuperation in turn.

In Fig. 9 I show a structure in which I employ two drawing stations, there being three reducing points, one of them idle for recuperation. After drawing, the float members will be shifted one way, as per arrows, first float taking position 49² and bringing new float for drawing, and freeing position 50 for recuperation; at the succeeding shifting the float will be moved to the left and assume first position.

In Figs. 10, 11, 12, 13, I show my preferred form of embodiment, in which I use a single floating drawing member 16 in a single forehearth 61, the walls of said forehearth projecting above the surface of the glass and with cover 8 forming the low heating chamber 6, said chamber being devoid of flues or auxiliary heating chambers and in free communication with the tank furnace 33; arch 49' spaced above the glass provides passage 49 wherethrough member 16, which is of less dimension, may be floated either into chamber 6 for drawing or into furnace 33 for recuperation; member 16 is shown shoved through opening 49 into the deep heated chamber 33, and held there in operative reducing position by means of holding member 36 in glass 33' while the body of glass 34 is freed for recuperation. The walls of the forehearth 61 are devoid of inner obstruction or shelves to permit depressing said float member 16 freely into the molten glass 34, said glass being of sufficient unimpeded depth for the purpose, thus permitting working the glass at low level while maintaining the same of high fluidity and purity. Fig. 11 is a vertical sectional view in which I show the drawing member shoved through opening 49 in its operative drawing position within the low heated chamber 6; body of glass 33' is now free to recuperate. Turn-buckle 63', provided within reach, affords means to adjust relative vertical position of the ring member, and therefore the float.

In Fig. 10 I show the lid 35 supported spaced above the shelf 8 by rods 52, connected to an overhead trolley 58 which travels on a horizontal track 53, and is operated by means of cable 54 and wheel 55 drawn by hand or by motor 56 to move the same laterally away or to position over drawing opening. The track may have an outward declination.

The front wall sometimes has a tendency to be cold in relation to the back portion of the drawing member, which is subjected to a greater extent to the heat from the furnace passing out through opening 49. Heating burners placed behind drawing point are of no avail. Burners placed in front also direct their flames away from the front. I overcome this difficulty by providing oblique opening or burners 64 beside the drawing point, in position to direct their flames toward the front wall, as shown in Fig. 12, a plan view of Fig. 10 on line D—D. Thus no additional heat is applied behind the drawing member, and the end of my flame strikes the front of the forehearth at the exact location, 58 and 59, which need be heated; thereby uniform temperature, or increased temperature toward the front of the drawing chamber, so essential to good results, is obtained. Furthermore, the excess of the combustion gases may pass off through openings 59 without affecting the drawing point. Fig. 13 is a plan view of Fig. 11 on line 13—13. Portions of shelf 56' and 56⁴ are preferably integral and removably set upon the wall of the forehearth, and the sections may be dome-shaped. In Fig. 11, 49' indicates the arch of the furnace.

Shortly before drawing begins holding member 36 is raised, releasing the drawing ring 16 which floats gently automatically to or toward drawing position. Plugs, shown by dotted lines 62—63, preferably of refractory material may be provided to retain the same in suitable drawing position at drawing point, in place of ring shield 10. When used in this connection, however, said shield 10 or its support 9 may not contact with the drawing ring or float 16, when lowered for the purpose of holding said ring in position.

The lid 35 is now removed, freeing opening 8'; recuperated ring 10 is lowered through said opening until its water-cooled hollow metal support 9 contracts with the horizontal surface of member 16, which member segregates a mixed portion of glass from which cylinder 24' is drawn through ring 10 from said glass exposed to the atmosphere, but free from subjection to either highly heated or highly chilling surrounding walls; thus articles may be rapidly drawn with soft tempered walls.

I shall reiterate the important fact, that the protecting ring device not being a part of the forehearth cover is removed from the furnace and protected between draws; in fact, its inner face 10' is never at any time materially exposed to the heat of the furnace.

Figs. 14 to 19 are fractional views of modifications of the protecting refractory ring device 10 and hollow metal water-cooled support therefor.

I show in Fig. 15 a fluid cooled support 9, of prismatic shape, the overhung flange 20 depending below the same said flange as shown, may be lowered in a position spaced from or in contact with top of float 16 during drawing. In Fig. 16 I show a water cooled support 9, one which by absorption, serves also to prevent undue escape of heat at 65; refractory diaphragm 66 preferably protects the cylinder from cooling effect of the support. Fig. 17 shows a supported diaphragm angular in cross section. In Fig. 18 the support is shown loosely embedded within the diaphragm.

Fig. 19, shows a refractory ring 10 rectangular in cross section, rabbeted at its inner lower edge, into which fits a water-cooled hollow metal support 9, preferably square or rectangular in cross section and projecting beneath said ring as shown. A set of water feed pipes 11 are tightly connected thereto and support it, little water being required in this case to maintain said members in good operative condition.

Heretofore in glass drawing devices, uncooled metal supports have been used, corrosion and deformation of the support due to the furnace heat resulting with deformation, and loss of the supported refractory element. My support preferably projects below the refractory member 10, so as to without adhesion, contact with the top portion of float member 16, and hold or depress said float member in suitable position for drawing. I make my support 9 preferably in two half round sections, as shown in Fig. 35, which is an enlarged fractional top view, and connect the sections 9 and $9^2$ together by means of left and right threaded male T's $9^3$, dotted line 10 and $10^3$ showing the relative position of the sections of the ring in easy relation thereon. However, the support may be made integral.

Fig. 20 shows an alternative means for supporting the shelf or ring member; if necessary an opening 70 in the clay proper which may be engaged as shown by hook 71, the hook in this case remaining cool.

In Figs. 21, 22 and 23, I show modifications of the vertically moving composite ring adapted to pass freely through the opening provided in the cover of the tank 8.

Fig. 22 is a full side view of the ring, the integral refractory ring 10 has an outer recess in which the hollow metal sections 9 and $9^2$ are suspended and water cooled by a set of pipes 52, which sections are coupled in the recess by means of bolt 9' and support said ring 10 as shown.

Fig. 21 is a sectional view, the same as that of Fig. 22, except in this case the water cooled support 9 is integrally supported and cooled by feed pipes 52 in which water circulates as per arrow; support 9 is shown in the outer recess $10^6$ of the inner refractory ring, which ring, as at 10, preferably protects the glass article to be drawn therein from the cooling effect or heat absorption of the support 9. Said support 9 is also protected from the heat beneath by the inwardly declined flange of the ring $10^5$; it is spaced from the inner edge of the opening in the cover 8, but by absorption prevents material escape of heat from beneath through space 8'; the inner refractory ring in this case is made up in sections as 10 and $10^3$. However, as shown in Fig. 23, a plan view of the device similar to Figs. 21 and 22, both the support and the ring may be made up in sections. I prefer to make the water cooled support in two parts 9 and $9^2$, each section having an inlet and outlet water pipe 52, and the inner refractory ring in four sections 10, 10', $10^2$, $10^3$, respectively, and assembled as shown, with the refractory ring in easy relation with respect to the support so as to avoid interfering with the free play under the different expansion and contraction of the said elements in operation.

Figs. 24, 25, 26, 30, illustrate various modifications of my self-feeding pot or ring, with the opening 22 preferably circular below the surface of the glass within the diameter 24' of the base of cylinder as drawn; and the pot is constructed preferably with a flat bottom to segregate a shallow portion of glass $22'$, as in Fig. 26, whereby the base of the cylinder $22^3$ drawn from the glass over the bottom of the pot $22^2$ is somewhat anchored thereto; or the pot may be constructed to segregate a deeper portion of glass, as shown in Fig. 24. Fig. 25 is a top view showing that gravity flange 19 may be polygonal in outline.

In Fig. 28 I show a top view and in Fig. 27 a side sectional view of a drawing member having its gravity flange 19 longer on one side than on the other side, in this case, eccentric in relation to the pot. However, because the flat sides and numerous angles afford suitable guides for the workman in adjusting or turning the ring in the glass so as to correct inequalities in the cylinder drawn; I preferably make the flange octagonal in contour, as shown in Fig. 25, and with the larger side toward the tank in drawing. There may be a flange 18, and the glass feeding opening 22, as in the other floats, may be enlarged at will, as shown in the figures, preferably constructed with walls of greater radius and less body of clay at point $19^3$, Fig. 27. In Fig. 30 I show the member slightly oblong; and in Fig. 29 I show a cylindrical pot fed from the side circumferentially through suitable openings $22^4$ made in the base of the side wall. In this, as in the case of pots shown in Fig. 26, and others, the angle between the walls and the bottom is exactly a right angle. I may also make my pot with the walls inclined inward as in Fig. 36 at $80^4$. Floating ring and member 10 may also be constructed that way.

I prefer to have my segregating member float on an even keel, so that the cylinder may be drawn more easily and any slight tendency to tilt or cant, due to unequal weight of ledge on one side or the other, may be corrected by support 9, or ring and support, as the case may be.

I show in Figs. 31, 32, 33, a ring or pot made in parts or sections. One of the parts is rabbeted or shouldered so that the other can fit therein. In this case the flange 19 is shown provided with a shoulder 80, Fig. 31, or a rabbet 81, Fig. 32, into which the open bottom pot 80′ may fit. In case one part or section becomes cracked or otherwise injured, it may be removed and replaced by another without the necessity of removing and destroying the whole. I may provide joints other than those described, if desired. For instance, I may have a joint at 90—91, Fig. 32, thus providing a separable bottom.

What I claim as new and desire to secure by Letters Patent is:

1. In an apparatus for drawing glass cylinders, a furnace, a forehearth extending from said furnace, a wall between the two, a recess in said wall and cooling means in said recess, a cover for said forehearth having an opening therein, a ring in said opening, a support for said ring, said support extending under said ring, means for raising and lowering said support and ring, and a glass segregating element adapted to float in the glass in the forehearth and to rise into contact with the ring support without adhesion.

2. In an apparatus for drawing glass, in combination, a glass tank, a forehearth connected with said tank, means for cooling said forehearth in the tank side and for heating it on the other side, whereby the temperature of the glass in the forehearth may be kept substantially even, a lid for said forehearth having an opening therein, a ring passing said opening, a support for said ring, said support extending under said ring, and a glass segregating and drawing element adapted to float in the glass and to contact with said ring support whereby a cylinder may be drawn from a segregated mass of mixed and even temperatured glass under equable temperature conditions.

3. In an apparatus for drawing glass, in combination, a glass tank, a forehearth opening therefrom, a floating glass segregating and mixing drawing pot, there being an opening between the tank and forehearth through which said pot may be floated from drawing to recuperating position, said forehearth being provided with openings, obliquely arranged, and fuel pipes in said openings discharging against the front wall to keep the forehearth at even temperature during the segregating and drawing acts.

4. In an apparatus for drawing glass cylinders, in combination, a forehearth, a flanged segregating and mixing ring adapted to float in said forehearth when the furnace is in operation and said forehearth provided with glass, a cover for said forehearth having an opening therein, a protecting ring, a fluid-cooled support therefor, means for raising and lowering said ring after drawing to replace said ring by a cover, said means consisting of tubes through which cooling fluid may be circulated, and means for drawing a glass cylinder when said ring is in position.

5. In a glass drawing apparatus, in combination, a tank, a forehearth, and a drawing pot, the tank and forehearth having an open connection between them, through which the pot may be floated to recuperating position and may be floated back to operative position, and a holder crossing said open connection but leaving it free for passage of gases, said holder adapted to secure said pot in its recuperative position against its tendency to float back to operative position.

6. In an apparatus for drawing glass cylinders, in combination, a main furnace, a forehearth, a segregating and mixing ring adapted to float from a position in the furnace to a position in the forehearth, means for keeping the glass in said ring hot, a cover for said forehearth, said cover having an opening over the ring position, a lid for said opening, means for moving said lid, a refractory ring and a support for said ring, said support engaging and holding the segregating ring during drawing.

7. In an apparatus for drawing glass cylinders, in combination, a main furnace, a forehearth, a segregating and mixing ring adapted to float from a position in the furnace to a position in the forehearth, means for keeping the glass in said ring hot, a cover for said forehearth, said cover having an opening over the ring position, a lid for said opening, means for lifting said lid, a refractory ring adapted to pass through said cover, and a fluid-cooled support for said refractory ring.

8. In an apparatus for drawing glass, in combination, a receptacle for molten glass, a segregating member adapted to float therein, a clay ring, a water-cooler support for said ring, and means for raising said ring and support and for lowering them as a whole into contact with said segregating member.

9. In a glass drawing apparatus, in combination, a segregating ring, a bait, a drawing head carrying said bait, a hollow cable supporting said drawing head, and means for supplying air through said cable and bait to the cylinder.

10. In apparatus for drawing glass, a refractory shield, a water-cooled support supporting and projecting beneath said shield, and a float adapted to take position in contact with said water-cooled support in spaced relation with said refractory shield.

11. In apparatus for drawing glass, a refractory shield, a water-cooled support therefor, and a float adapted to releasably contact with the support of the shield, said float being constructed so as to, when in position, shield the glass therein and article drawn from said support.

12. In glass drawing apparatus, a float, a shield, means for moving said shield with respect to the top of the float, and means whereby the shield may be kept in non-adherent condition with respect to the float at all temperatures so that said float may be adjusted in suitable drawing position with respect to the shield at all times.

In testimony whereof, I affix my signature.

ARTHUR E. SPINASSE.